US012612887B2

(12) United States Patent
Lepsch et al.

(10) Patent No.: US 12,612,887 B2
(45) Date of Patent: Apr. 28, 2026

(54) SYSTEM AND METHOD FOR MANAGING THE TEMPERATURE OF INJECTED FUEL IN INTERNAL COMBUSTION ENGINES FROM A MIXTURE OF AIR FLOW AND FUEL APPLICABLE TO A VEHICLE

(71) Applicant: Robert Bosch Limitada, Campinas SP (BR)

(72) Inventors: Fernando Lepsch, Campinas SP (BR); Marcello Francisco Brunocilla, Indaiatuba SP (BR)

(73) Assignee: Robert Bosch Limitada, Campinas SP (BR)

(*) Notice: Subject to any disclaimer, the term of this patent is extended or adjusted under 35 U.S.C. 154(b) by 0 days.

(21) Appl. No.: 18/254,978

(22) PCT Filed: Oct. 20, 2021

(86) PCT No.: PCT/BR2021/050458
§ 371 (c)(1),
(2) Date: May 30, 2023

(87) PCT Pub. No.: WO2022/109693
PCT Pub. Date: Jun. 2, 2022

(65) Prior Publication Data

US 2024/0003321 A1 Jan. 4, 2024

(30) Foreign Application Priority Data

Nov. 30, 2020 (BR) ......................... 102020024417-5

(51) Int. Cl.
*F02M 53/02* (2006.01)

(52) U.S. Cl.
CPC .................................. *F02M 53/02* (2013.01)

(58) Field of Classification Search
CPC .......... F02M 53/02; Y02T 10/12; Y02T 10/30
See application file for complete search history.

(56) References Cited

U.S. PATENT DOCUMENTS

| | | | |
|---|---|---|---|
| 4,397,287 | A | 8/1983 | Pierard |
| 2008/0149076 | A1 | 6/2008 | Wolber et al. |
| 2013/0081592 | A1 | 4/2013 | Boer et al. |

FOREIGN PATENT DOCUMENTS

| | | | |
|---|---|---|---|
| BR | PI0703440 | A | 4/2008 |
| BR | PI0902488 | A2 | 4/2010 |
| BR | 102012017841 | A2 | 8/2014 |
| BR | 102015006123 | A2 | 12/2015 |
| BR | 102018077092 | A2 | 7/2020 |
| CA | 2326869 | A1 | 5/2002 |
| CN | 103912429 | B | 6/2018 |

(Continued)

OTHER PUBLICATIONS

Translation of International Search Report for Application No. PCT/BR2021/050458 dated Jan. 29, 2022 (3 pages).

(Continued)

*Primary Examiner* — Phutthiwat Wongwian
(74) *Attorney, Agent, or Firm* — Michael Best & Friedrich LLP

(57) ABSTRACT

The present invention relates to a system and method for managing the temperature of fuel injected into internal combustion engines from a mixture of an air flow and fuel applicable to a vehicle that uses an injection system with high pressures.

7 Claims, 1 Drawing Sheet

(56) References Cited

FOREIGN PATENT DOCUMENTS

| | | | | |
|---|---|---|---|---|
| CN | 208073659 | U | | 11/2018 |
| DE | 10045753 | A1 | | 3/2002 |
| DE | 10140070 | A1 | | 2/2003 |
| DE | 102018123673 | A1 | | 9/2019 |
| DE | 102018210230 | A1 | | 12/2019 |
| JP | H0219651 | A | | 1/1990 |
| JP | 2004-518071 | | * | 6/2004 |
| JP | 2005299422 | A | | 10/2005 |
| JP | 2009036086 | A | | 2/2009 |
| JP | 2010196576 | A | | 9/2010 |
| RU | 2405961 | C2 | | 12/2010 |
| WO | 2005024225 | A1 | | 3/2005 |
| WO | 2008054315 | A1 | | 5/2008 |
| WO | 2009094735 | A1 | | 8/2009 |
| WO | 2011055295 | A1 | | 5/2011 |
| WO | 2015069265 | A1 | | 5/2015 |
| WO | 2017221036 | A1 | | 12/2017 |
| WO | 2017221039 | A1 | | 12/2017 |

OTHER PUBLICATIONS

Translation of International Preliminary Report on Patentability for Application No. PCT/BR2021/050458 dated Jan. 9, 2023 (6 pages).

* cited by examiner

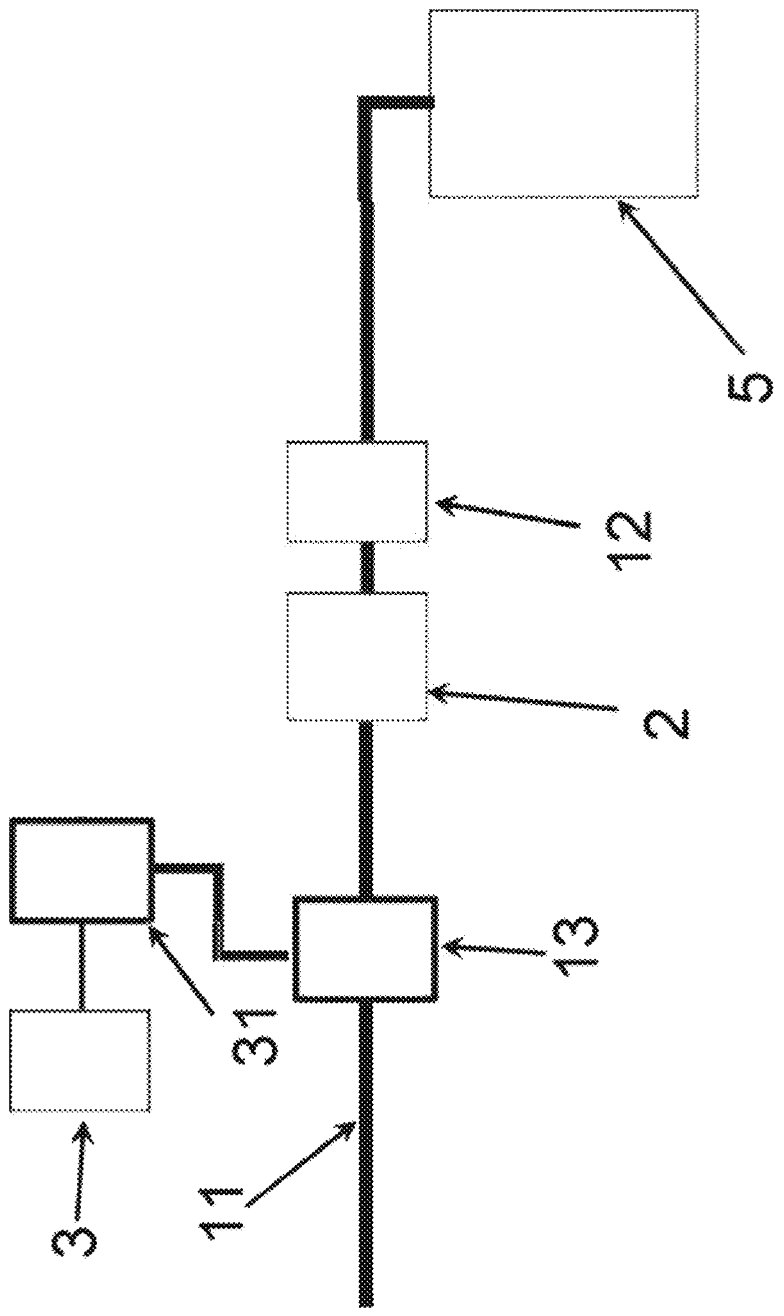
5
12
2
13
31
3
11

SYSTEM AND METHOD FOR MANAGING THE TEMPERATURE OF INJECTED FUEL IN INTERNAL COMBUSTION ENGINES FROM A MIXTURE OF AIR FLOW AND FUEL APPLICABLE TO A VEHICLE

BACKGROUND

The present invention relates to a system and method for managing the temperature of injected fuel in combustion engines that allows the reduction of the amount of fuel injected under high pressure in engines that can be powered with both pure gasoline and ethanol or any bi-fuel mixture by precisely controlling the amount of heat made available to the fuel.

In recent years, problems with the amount of pollutants emitted (HC, CO, $CO_2$ and particulates, among others) mainly by car engines, has been a major problem for large cities. Thus, new technologies have been developed to help reduce pollutants emitted by internal combustion engines.

In order to mitigate the emission of greenhouse gases from automobiles and reduce dependence on fossil fuels, several alternatives for replacing the internal combustion engine are available. However, the best solution to this dilemma must take into account the geographic and socio-economic characteristics of the country, its energy matrix, its emissions legislation and the environmental impact of the fuel's carbon emissions throughout its life cycle.

Brazil has a strong reputation for its fleet of flex-fuel vehicles, long experience in the use of fuel ethanol and its distribution network. This sets it apart from other global markets and justifies a unique approach to reducing aldehyde emissions, for example.

Yet, there are some limitations in the use of dual-fuel engines (popularly known as flex-fuel engines). To meet the demand for using two fuels in a single tank, the sizing of a flex-fuel engine tends to be intermediate, since the sizing of single-fuel engines is different, depending on the fuel ethanol or gasoline. This is because the vast majority of dual-fuel engines usually have a single geometric compression ratio, which represents the ratio between the aspirated volume plus the combustion chamber volume in relation to the combustion chamber volume).

In its course, the piston reaches a higher and a lower point in its displacement, called respectively top dead center (TDC) and bottom dead center (BDC).

Usually, the engine of a passenger vehicle has four strokes:

Admission

Compression

Combustion

Escape

The effect of the compression rate is evident in the second half—the intake valves close after the injection of the air/fuel mixture and the latter is compressed so that the combustion process begins. In this way, the engine's geometric compression ratio is obtained: the ratio between the volume of the piston's combustion chamber at its bottom dead center PMI (largest volume) and its top dead center PMS (smallest volume).

Gasoline engines tend to use lower compression ratios (typically between 8:1 and 12:1), while ethanol-powered engines work best with higher ratios (12:1 or even 14:1).

However, before the fuel reaches the combustion chamber, it travels a path from the vehicle's tank. This fuel is moved by a fuel pump and flows through ducts that transport the fuel—first, a hose and, later, a more rigid and branched duct called a gallery. The branches lead the fuel to be injected into the respective cylinders and it is at the exit of these branches where the fuel injectors are positioned.

In addition, the impingement of fuel on the surface of the piston or on the walls of the intake ducts can contribute to the increase of emitted particles. Moreover, fuel condensation in cold zones of the engine can result in incomplete combustion generating hydrocarbons and carbon monoxide (HC and CO).

When talking about engines that use the Otto cycle (engines traditionally used in cars), both those that use Port Fuel Injection (PFI) and those that work with Direct Injection (DI) emit particulates above of the allowed limits. Therefore, the use of a particle filter for gasoline engines (whose acronym is GPF, as it comes from the English Gasoline Particulate Filter) has been recommended to comply with the new legislation on particle emissions that came into force.

However, even with the use of GPF, engines can still generate particulates above the limits determined by official health agencies, since pollutant emissions also depend on the behavior of drivers regarding the way they drive and proper vehicle maintenance.

As is known, engines that use direct injection (DI engines) at high pressure (from 200 BAR to 750 BAR, for example) are more likely to further reduce emissions of polluting gases, since, the higher the pressure, the greater the reduction. However, operating under such high pressures brings a series of inconveniences, such as the drastic reduction in the durability of the internal components of the injection system, as well as the demand for a significantly increase in fuel consumption in order to raise the injection pressure system work to the desired levels.

Therefore, the most trivial solution would be the development of extremely robust parts and components of the fuel injection system to withstand pressures above 500 BAR, which would lead to an increase in the costs of development and manufacture of companies that supply injection systems and vehicle assemblers.

Thus, it is understood that the main technical problem to be overcome is the fact of injecting fuel at high pressures and preserving the durability of its internal components (without increasing its complexity), extracting from the fuel system fuel injection the maximum benefit of a significantly large reduction in the amount of emissions, without increasing fuel consumption, making it more efficient.

That said, one of the most effective techniques to obtain a more correct fuel burning is to deliver it to the previously heated combustion chamber. However, it is understood that there is a need to integrate this technique into a high-pressure system.

In this regard, some solutions are already known, such as the one described in patent document PI 0902488-3. This document describes a fuel heater provided for internal combustion engines having a device to determine the fuel temperature and pressure, adjust the target fuel temperature, according to the fuel pressure detected by a pressure sensor and a fuel temperature control device that controls the fuel heater so as to adjust the temperature detected by a sensor to the target temperature of the fuel.

However, in the invention described in this patent document, the use of a fuel pressure sensor is mandatory, causing the target temperature to be adjusted according to the measured fuel pressure. In addition, the technique described in this document does not mention the need to know the temperature upstream of the heater, which makes the calculation of the power required to heat the fuel even less accurate, not satisfactorily meeting the requirement of obtaining a reduction in emissions of polluting gases.

Another technique related to the present problem is described in patent document WO2017/221036. In general terms, this invention describes a vehicle that has reduced fuel injection volumes due to fuel heating. In more detail, that document describes a vehicle with an internal combustion engine provided with at least one heater to heat the fuel before it is delivered to the cylinder by the fuel injector; a fuel pump to supply fuel to the heater, and an electronic controller to control engine torque and fuel pressure generated by the pump, the engine controller using a model based on heating the heated engine fuel to control an amount of heated fuel supplied by the fuel injector, in order to reduce the amount of fuel injected for a given engine torque in relation to unheated fuel; and cause greater fuel pressure to be generated by the fuel pump relative to unheated fuel.

The technique disclosed in the patent document WO2017/221036 describes a system in which the control of the amount of fuel injected into the engine and the increase in fuel pressure is performed based on a model of fuel heating in relation to the unheated model. That is, it employs a very complicated logic, which uses two injection control methods.

In this scenario, it is considered essential to control the temperature according to the engine's dynamic operating load so that heating is not provided that requires excessive and unnecessary energy to heat the fuel, integrated with the use of injection under high pressure to reduce, even more effectively, the emissions of polluting gases, and none of the aforementioned patent documents discloses a technique that foresees a method of managing the fuel temperature according to the operating dynamics of the engine of the vehicle incorporating the use of high-pressure fuel injection.

SUMMARY

Thus, the present invention proposes to enable the use of a DI direct injection system that works with pressures around 200 BAR to obtain results similar to systems that use extremely high pressures (750 BAR, for example), maintaining the durability of the injection system's internal components, as well as preserving fuel consumption.

The present invention aims to provide a system and a method of managing the temperature of fuel injected into internal combustion engines from a mixture of an air flow and fuel applicable to a vehicle, in a way to enable the use of a DI direct injection system that works with pressures around 200 BAR to obtain results similar to systems that use extremely high pressures (750 BAR, for example), maintaining the durability of the internal components of the injection system, as well as preserving fuel consumption through direct injection of heated fuel.

In order to solve the technical problem presented and overcome the inconveniences of the state of the art, the present invention aims to provide a fuel temperature management system injected into an internal combustion engine from a mixture of a flow of air and fuel applicable to a vehicle, said engine being provided with at least one line for transporting fuel that carries a quantity of at least one fuel to be injected;

at least one fuel heater device;

at least one fuel heating control device associated with at least one fuel heating device;

at least one high-pressure pump associated with the fuel transport line;

at least one fuel distribution device associated with the fuel transport line;

so that said system performs the steps of performing a fuel heating action;

applying an amount of pressure to the fuel at an initial temperature that is transported by the fuel transport line;

where the fuel heater device is positioned downstream of the high pressure pump.

It is also the objective of the present invention to provide a method of managing the temperature of fuel injected into an internal combustion engine from a mixture of an air flow and fuel applicable to a vehicle, said engine being equipped with at least one line for transporting fuel that carries a quantity of at least one fuel to be injected;

at least one fuel heater device;

at least one fuel heating control device associated with at least one fuel heating device;

at least one high-pressure pump associated with the fuel transport line;

at least one fuel distribution device associated with the fuel transport line;

said method comprising the steps of performing a fuel heating action;

applying an amount of pressure to the fuel at an initial temperature that is transported by the fuel transport line (1).

BRIEF DESCRIPTION OF THE FIGURE

FIG. 1—Schematic of an embodiment of the fuel temperature management system.

DETAILED DESCRIPTION

Engines that employ direct injection (DI engines) at high pressure (from 500 BAR to 750 BAR, for example) are more likely to further reduce pollutant gas emissions, as high pressure provides greater efficiency in fuel spraying, making this type of system achieve a reduction in emissions. However, submitting a DI direct injection system that works with pressures around 200 BAR to extremely high pressures (500 BAR, for example) drastically affects the durability of the internal components of the injection system, as well as significantly increases fuel consumption.

In this regard, the present invention enables the use of a DI direct injection system that works with pressures around 200 BAR to obtain results similar to systems that use extremely high pressures (750 BAR, for example), maintaining the durability of the injection system's internal components, as well as preserving fuel consumption through direct injection of heated fuel.

The fuel heating and heating management system is responsible for heating the fuel that will be injected into the engine to a predetermined temperature. The purpose of heating the fuel is to improve the atomization of the injected fuel spray, reducing its droplet size, which means better preparation of the air-fuel mixture, leading to a more homogeneous mixture, which will lead to a reduction in the amount of fuel injected and thus reducing the amount of gases and particulates emitted.

The operation of the heating system takes place from the start of the engine. System management aims to keep the temperature of the injected fuel always at the target temperature. For this, the system determines the amount of energy that must be supplied to the fuel, based on the fuel inlet temperature in the gallery, the fuel flow rate and the type of fuel.

Therefore, as can be seen in FIG. 1, the present invention discloses a system and respective method of managing the temperature of fuel injected into an internal combustion engine from a mixture of an air and fuel flow applicable to a vehicle, such as a car.

In more detail, the present invention describes a fuel temperature management system injected into an internal combustion engine from a mixture of an air flow and fuel applicable to a vehicle, said engine being equipped with

- at least one line for transporting fuel 11 that carries a quantity of at least one fuel to be injected;
- at least one fuel heater device 13;
- at least one fuel heating control device 3 associated with at least one fuel heating device 13;
- at least one high pressure pump 2 associated with the fuel transport line 11;
- at least one fuel distribution device 12 associated with the fuel transport line 11; so that said system performs the steps of
- applying an amount of pressure to the fuel at an initial temperature which is carried by the fuel transport line 11;
- performing a fuel heating action;
- the fuel heater device 13 being positioned downstream of the high pressure pump 2.

This preferred configuration described above is new and inventive, as the positioning and installation of the heater device 13 downstream of the high-pressure pump 2 (responsible for pressurizing the fuel to 200 BAR, this value being able to vary upwards) is extremely simple and allows the pressurized fuel to be heated directly to a target injection temperature in the combustion chamber 5, in order to consider possible thermal load losses due to the thermal resistance of the high pressure pump 2, of the transport line itself of fuel 11 and the fuel distribution device 12 (also known as "distribution gallery"), without compromising the performance of the system.

The determination of the amount of energy required for the fuel to reach a target fuel temperature value at the current instant, according to the fuel pressure gradient at the current instant, must be performed by a device or unit of vehicle parameter processing control 3, which is primarily responsible for the intelligence of the engine as a whole. This control unit 3 can comprise both the ECU (Electronic Control Unit-responsible for electronically managing the entire engine operation) already present in the vehicle, as well as an exclusive and dedicated unit 31 just for the fuel heating system.

Additionally, the present invention also describes a method of managing the temperature of fuel injected into an internal combustion engine from a mixture of an air flow and fuel applicable to a vehicle, said engine being equipped with

- at least one line for transporting fuel 11 that carries a quantity of at least one fuel to be injected;
- at least one fuel heater device 13;
- at least one fuel heating control device 3 associated with at least one fuel heating device 13;
- at least one high pressure pump 2 associated with the fuel transport line 11;
- at least one fuel distribution device 12 associated with the fuel transport line 11; in a way so that said system performs the steps of
- performing a fuel heating action;
- applying an amount of pressure to the fuel at an initial temperature which is carried by the fuel transport line 11.

This preferential method configuration brings a new and innovative technical effect, since heating the fuel before passing through the high pressure pump 2, which is responsible for pressurizing the fuel to 200 BAR (this value can be varied upwards), is extremely simple, the installation of the fuel heater device 13 is simple and allows the pressurized fuel to be heated directly to a target injection temperature in the combustion chamber 5, considering possible thermal load losses due to thermal resistance of the high pressure pump 2, the fuel transport line 11 and the fuel distribution device 12 (distribution gallery), without compromising the performance of the heating system.

Thus, in an alternative embodiment, the present invention describes a method of managing the temperature of fuel injected into an internal combustion engine, so that the step of performing a fuel heating action comprises the steps of

- determining an amount of energy required for the fuel to reach a target fuel temperature value according to a fuel flow value at the current instant;
- performing an action to provide the amount of energy necessary for the injected fuel to reach the target temperature;
- performing a second action.

In a particular embodiment, this invention describes a method of managing the injected fuel temperature in an internal combustion engine, where the step of performing a second action comprises the steps of

- comparing heated fuel temperature against current target temperature;
- performing an action between heating the fuel until the current fuel temperature is greater than or equal to the current target fuel temperature and stop heating the fuel.

Preferably, this check or comparison can be carried out by means of a temperature test or any other device, algorithm or means that is capable of allowing this information to be obtained. Stop heating means any action that interrupts the action of providing heat to heat the fuel.

Also in yet another alternative embodiment, the present invention also describes a method of managing the temperature of injected fuel in an internal combustion engine, where the step of determining an amount of energy required for the fuel to reach a target temperature value of the fuel is associated with an amount of total thermal resistance downstream of the fuel heater device 13.

In an alternative embodiment, the present invention describes a method of managing the injected fuel temperature in an internal combustion engine, where the step of determining an amount of energy required for the fuel to reach a target fuel temperature value is associated to the amount of pressure applied to the fuel at the current instant.

The method of managing the injected fuel temperature in internal combustion engines is preferably applicable to an internal combustion engine comprising an engine with DI direct injection. However, it can be applicable to any engine that has a high pressure fuel line.

In yet another alternative embodiment, the present invention discloses a method of managing the injected fuel temperature in internal combustion engines, where the amount of pressure comprises a predetermined value. The value referring to the amount of pressure can be fixed or vary according to an operating envelope or according to the engine load.

Alternatively, the present invention describes a method of managing the injected fuel temperature in internal combustion engines, where the amount of pressure is associated with the fuel flow.

The determination of the amount of pressure applied to the fuel, as well as the amount of energy required for the fuel to reach a target fuel temperature value at the current instant, according to the fuel pressure gradient at the current instant must be performed by a vehicle parameter processing device or control unit 3, which is preferably responsible for the intelligence of the engine as a whole. This control unit 3 can comprise both the ECU (Electronic Control Unit—responsible for electronically managing all engine operation) already present in the vehicle, and it can also comprise an exclusive and dedicated unit 31 just for the fuel heating system.

Thus, it should be noted that, as described above, the present invention achieves the objective of providing a system and a method of managing the temperature of injected fuel in internal combustion engines from a mixture of an air flow and fuel applicable to a vehicle, in order to enable the use of a DI direct injection system that works with pressures around 200 BAR to obtain similar results to systems that use extremely high pressures (750 BAR, for example), maintaining the durability of the internal components of the injection system, as well as preserving fuel consumption, through the direct injection of heated fuel.

Therefore, the present invention also fulfills the role of enabling the increase in power extracted from the engine associated with lower fuel consumption and consequent reduction of polluting gases by the engines.

What is claimed is:

1. A fuel temperature management system for fuel injected into an internal combustion engine based on a mixture of air and fuel flow applicable to a vehicle, said engine being equipped with at least one line for transporting fuel (11) which carries a quantity of at least one fuel to be injected;

at least one fuel heater device (13);

at least one fuel heating control device (3) associated with at least one fuel heater device (13);

at least one high pressure pump associated with the fuel transport line (11); and at least one fuel distribution device (12) associated with the fuel transport line (11);

so that said system performs steps of performing a fuel heating action; and applying an amount of pressure to the fuel at an initial temperature which is carried by the fuel transport line (11);

wherein the engine is configured such that the quantity of the at least one fuel to be injected flows from the fuel heater device (13) to the high pressure pump (2), and wherein the fuel heating action reaches a target injection temperature determined by the fuel heating control device (3) based on vehicle parameter processing associated with an amount of total thermal resistance downstream of the fuel heater device (13).

2. A method of managing a temperature of fuel injected into an internal combustion engine from a mixture of an air flow and fuel applicable to a vehicle, said engine having at least one line for transporting fuel (11) which carries a quantity of at least one fuel to be injected;

at least one fuel heater device (13);

at least one fuel heating control device (3) associated with at least one fuel heater device (13); and at least one high pressure pump associated with the fuel transport line (11);

at least one fuel distribution device (12) associated with the fuel transport line (11);

said method comprising determining an amount of energy required for the fuel to reach a target fuel injection temperature associated with an amount of total thermal resistance;

performing a fuel heating action based on processing vehicle parameters; and applying an amount of pressure to the fuel at an initial temperature which is conveyed by the fuel transport line (11).

3. The method of claim 2, wherein performing the fuel heating action comprises steps of determining an amount of energy required for the fuel to reach the target fuel injection temperature according to a fuel flow value at a current instant;

performing an action to provide an amount of energy necessary for the injected fuel to reach the target fuel injection temperature;

performing actions of comparing the heated fuel temperature in relation to the target fuel injection temperature; and heating the fuel until a current temperature of the fuel being heated is greater than or equal to the target fuel injection temperature, or stop heating the fuel.

4. The method of claim 3, wherein determining the amount of energy required for the fuel to reach the target fuel injection temperature is associated with an amount of pressure applied to the fuel at the current instant.

5. The method of claim 2, wherein the internal combustion engine comprises an engine with direct injection.

6. The method of claim 2, wherein the amount of pressure comprises a predetermined value.

7. The method of claim 2, wherein the amount of pressure is associated with the fuel flow.

* * * * *